US008418475B2

(12) United States Patent
Tanimura et al.

(10) Patent No.: US 8,418,475 B2

(45) Date of Patent: Apr. 16, 2013

(54) ATTACHMENT STRUCTURE OF COMBUSTION OSCILLATION DETECTING DEVICE

(75) Inventors: Satoshi Tanimura, Hyogo (JP); Sosuke Nakamura, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 666 days.

(21) Appl. No.: 12/519,574

(22) PCT Filed: Jun. 4, 2008

(86) PCT No.: PCT/JP2008/060311

§ 371 (c)(1), (2), (4) Date: Jan. 15, 2010

(87) PCT Pub. No.: WO2008/152964

PCT Pub. Date: Dec. 18, 2008

(65) Prior Publication Data

US 2010/0132375 A1 Jun. 3, 2010

(30) Foreign Application Priority Data

Jun. 11, 2007 (JP) ................................ 2007-154398

(51) Int. Cl.
*F02C 7/20* (2006.01)

(52) U.S. Cl.
USPC .............. 60/796; 60/39.24; 60/39.37; 60/747

(58) Field of Classification Search ................ 60/39.37, 60/796

See application file for complete search history.

(56) References Cited

U.S. PATENT DOCUMENTS 5,423,175 A * 6/1995 Beebe et al. ............... 60/39.281
6,857,320 B2 * 2/2005 Gleeson et al. ................. 73/756

FOREIGN PATENT DOCUMENTS

JP 61-202132 A 9/1986
JP 06-331146 A 11/1994
JP 7-16136 U 3/1995
JP 7-208734 A 8/1995
JP 11-094672 A 4/1999
JP 11-148370 A 6/1999
JP 3572177 B2 * 9/2004 ...................... 73/756
JP 2005-048992 A 2/2005

OTHER PUBLICATIONS

Korean Office Action dated Nov. 26, 2010, issued in corresponding Korean Patent Application No. 10-2009-7009759.

International Search Report of PCT/JP2008/060311, Mailing Date of Aug. 19, 2008.

Japanese Office Action dated Jun. 28, 2011, issued in corresponding Japanese Panten Application No. 2007-154398.

* cited by examiner

*Primary Examiner* — Ehud Gartenberg

*Assistant Examiner* — Scott Walthour

(74) *Attorney, Agent, or Firm* — Westerman, Hattori, Daniels & Adrian, LLP

(57) ABSTRACT

In order to reduce a manufacturing cost and a running cost, casings each housing a combustion oscillation detecting device are attached in an alternating manner to cross-flame tubes by which a plurality of combustors arranged annularly in a combustor casing are connected to each other.

6 Claims, 4 Drawing Sheets

ATTACHMENT STRUCTURE OF COMBUSTION OSCILLATION DETECTING DEVICE

TECHNICAL FIELD

The present invention relates to an attachment structure of a combustion oscillation detecting device for use in attaching a combustion oscillation detecting device, which monitors combustion oscillations generated by combustion of fuel in a combustor, to the combustor.

BACKGROUND ART

As disclosed in, for example, Patent Document 1, conventionally, combustion oscillations generated by combustion of fuel in a combustor have been monitored by using a pressure measuring device in the combustor of a gas turbine.

Patent Document 1: Japanese Unexamined Patent Application, Publication No. Hei 6-331146

DISCLOSURE OF INVENTION

However, according to the apparatus disclosed in the above-described Patent Document 1, one pressure sensor (combustion oscillation detecting device) must be provided for one combustor. In other words, the number of expensive pressure sensors to be required is equal to the number of combustors, resulting in the increase of a manufacturing cost. In addition, such a pressure sensor has a relatively short service life because of its use under high-temperature conditions and, consequently, must be replaced with new one in a few years, resulting in the increase of a running cost.

Also, in the case of a conventional method in which the pressure sensor is attached to a wall of a combustor basket (combustion liner), occasionally, a pressure sensor attachment position varies depending on a positional relation between combustor baskets in a combustor casing, which fails to achieve commonality of the combustor baskets. Consequently, various combustor baskets must be designed and manufactured. Thus, there are also problems in the cost and maintainability.

The present invention has been conceived in view of the problems described above, and it is an object of the present invention to provide an attachment device of a combustion oscillation detecting device capable of reducing a manufacturing cost and a running cost.

In order to accomplish this object, the present invention adopts the following solutions.

In an attachment structure of a combustion oscillation detecting device according to the present invention, casings each housing a combustion oscillation detecting device are attached in an alternating manner to cross-flame tubes by which a plurality of combustors arranged annularly in a combustor casing are connected to each other.

With the attachment structure of the combustion oscillation detecting device according to the present invention, the number of expensive combustion oscillation detecting devices (pressure sensors) can be reduced in half (for example, while a conventional gas turbine including 16 combustors has required 16 combustion oscillation detecting devices, the number of combustion oscillation detecting devices can be reduced to eight by using the attachment structure of the combustion oscillation detecting device according to the present invention), so that manufacturing cost and running cost can drastically be reduced.

With the attachment structure of the combustion oscillation detecting device according to the present invention, the pressure sensor is attached to the cross-flame tube, so that commonality of combustor baskets of the combustor can be achieved. Further, in the case where the cross-flame tube is rotatable about a longitudinal axis, a pressure sensor attachment position can be changed with ease, so that a high design flexibility concerning the pressure sensor attachment position can be realized. Thus, reduction in costs and improvement in maintainability can be realized.

Since the combustor communicates with the cross-flame tube, the combustion oscillations generated in the combustor can also be detected in the cross-flame tube. Thus, use of one pressure sensor allows detection of combustion oscillations generated in two combustors coupled to each other through a cross-flame tube to which the pressure sensor is attached.

In the above-described attachment structure of the combustion oscillation detecting device, more preferably, a baffle plate is interposed between the casing and the cross-flame tube.

According to the attachment structure of the combustion oscillation detecting device, pressure fluctuations caused by combustion oscillations are transmitted to the combustion oscillation detecting device (pressure sensor) through the baffle plate. Therefore, stable pressure detection is carried out, and prevents the combustion oscillation detecting device from being operated erroneously.

A combustor of a gas turbine according to the present invention includes the attachment structure of the combustion oscillation detecting device capable of considerably reducing the manufacturing cost and the running cost.

According to the combustor of the present invention, the manufacturing cost and the running cost of the combustor as a whole can drastically be reduced.

A gas turbine according to the present invention includes the combustor capable of considerably reducing the manufacturing cost and the running cost.

According to the gas turbine of the present invention, the manufacturing cost and the running cost of the gas turbine as a whole can drastically be reduced.

The present invention produces an advantageous effect capable of reducing a manufacturing cost and a running cost.

BEST MODE FOR CARRYING OUT THE INVENTION

With reference to FIG. 1 to FIG. 5; hereinafter, description will be given of one preferred embodiment of an attachment structure of a combustion oscillation detecting device according to the present invention.

A gas turbine for use in electric power generation and the like mainly includes a compressor, a combustor, and a turbine. A generator is rotated by the turbine in order to generate electric power. In many instances, such a gas turbine includes a plurality of combustors. A mixture of air compressed by the compressor and fuel fed into each combustor is burned in each combustor to generate high-temperature combustion gas, and then the high-temperature combustion gas is fed into the turbine.

Figure 1:
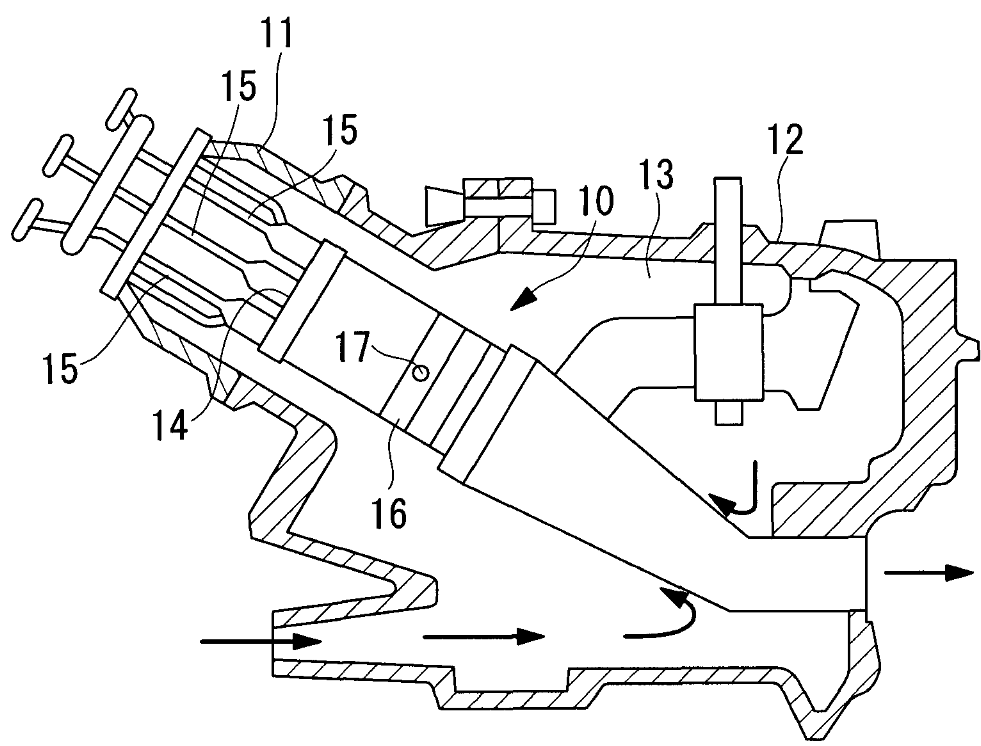
FIG. 1 is a side sectional view showing a periphery of a combustor of a gas turbine, the combustor including an attachment structure of a combustion oscillation detecting device according to one embodiment of the present invention.

FIG. 1 is a side sectional view showing a periphery of a combustor of a gas turbine, the combustor including the attachment structure of the combustion oscillation detecting device according to this embodiment. Herein, FIG. 1 partly shows a section of the gas turbine in order to describe arrangement of a combustor in a chamber.

A plurality of combustors 10 (FIG. 1 shows only one combustor) of the gas turbine are arranged annularly in a combustor casing 11. A chamber 13 is formed inside the combustor casing 11 and a gas turbine casing 12, and is filled with compressed air. Although not shown in the figure, the air that is compressed by a compressor provided on an upstream side is introduced into the chamber 13. The air is fed into the combustor 10 through an air inlet 14 provided on an upstream side of the combustor 10 and then is mixed with fuel that is also fed into the combustor 10 through a plurality of fuel nozzles 15 each provided on an upper side of the combustor 10. After that, the mixture is burned in a combustor basket (combustion liner) 16 of the combustor 10, so that a combustion gas is generated. This combustion gas is fed into a turbine and rotates a turbine rotor.

Figure 2:
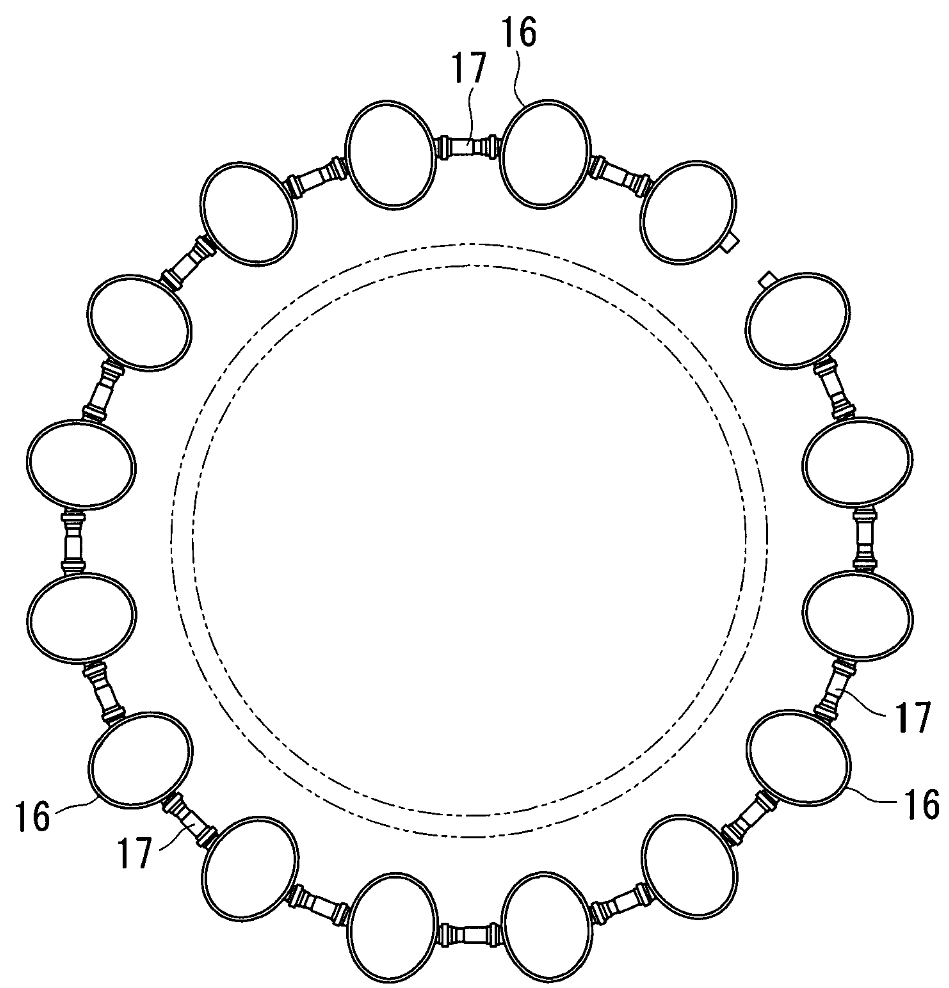
FIG. 2 is a front view showing an attachment position of an attachment structure of the combustion oscillation detecting device according to the embodiment of the present invention.

As shown in FIG. 2, the combustor baskets 16 of the plurality (16 in this embodiment) of combustors 10 arranged annularly in the combustor casing 11 are connected to one another through connecting pipes (cross-flame tubes) 17. When ignition occurs inside the combustor basket 16 of the combustor 10 through one or two ignition plug(s), which is or are not shown in the figure, the flame (ignited combustion gas) travels (passes, propagates) through the connecting pipes 17 by a differential pressure between the combustor 10 and the remaining combustors 10 at which ignition has not occurred yet. Thus, ignition can occur at the remaining combustors 10. That is, the connecting pipe 17 serves as an igniting device or a flame sustaining device for the combustor 10.

Figure 3:
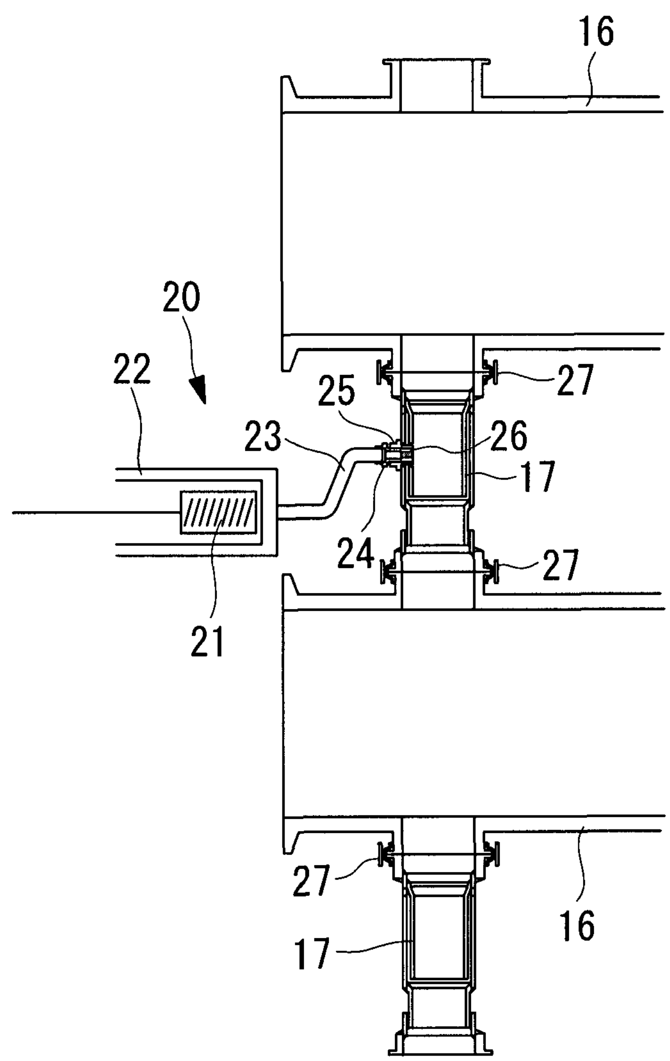
FIG. 3 is a cross sectional view showing an attachment structure of the combustion oscillation detecting device according to the embodiment of the present invention.

As shown in FIG. 3, the attachment structure 20 of the combustion oscillation detecting device according to this embodiment includes a casing 22 that houses a pressure sensor (combustion oscillation detecting device) 21, and a conduit 23 that communicates between an interior of the connecting pipe 17 and an interior of the casing 22 and transmits to the pressure sensor 21 pressure fluctuation propagating through the connecting pipe 17. The plurality of attachment structures 20 of the combustion oscillation detecting device are provided for the connecting pipes 17 one by one in an alternating manner. In other words, the connecting pipe 17 having the attachment structure 20 of the combustion oscillation detecting device and the connecting pipe 17 having no attachment structure 20 of the combustion oscillation detecting device are arranged in an alternating manner.

The pressure sensor 21 detects (monitors) the pressure fluctuations caused by combustion oscillations. The pressure sensor 21 may be a sensor using a piezo element (piezoelectric element), for example.

The conduit 23 is made of, for example, stainless steel (SUS), and one end thereof on an inlet side (connecting pipe 17 side) is fixed on an attachment seat 25 provided at a side face of the connecting pipe 17 with an adapter 24 being interposed therebetween. A baffle plate 26 having a plurality (seven in this embodiment) of through holes 26*a* (see FIG. 5) each penetrating therethrough in a thickness direction is provided on one end of the attachment seat 25 on the inlet side (connecting pipe 17 side).

Figure 4:
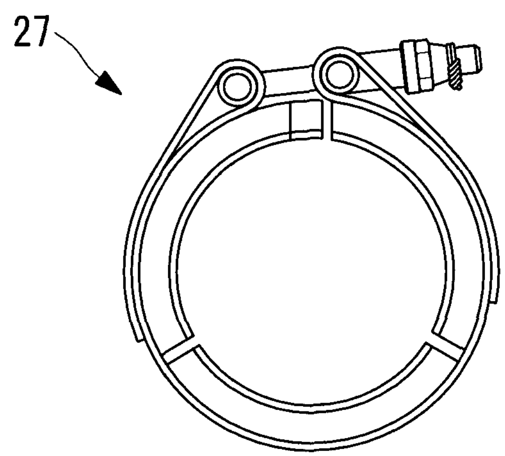
FIG. 4 is a front view showing a coupling member for coupling a combustor basket to a connecting pipe.
Figure 5:
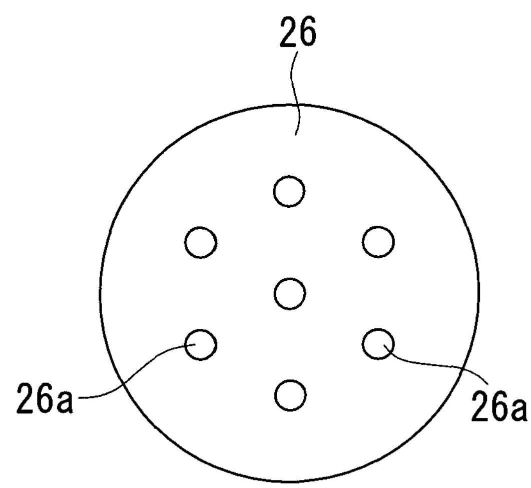
FIG. 5 is a front view showing a baffle plate provided on an upstream side of a pressure sensor.

The combustor basket 16 and the connecting pipe 17 are coupled (connected) by a coupling (connecting) member called Marman coupling (product name) 27 shown in FIG. 4.

With the attachment structure 20 of the combustion oscillation detecting device according to this embodiment, the number of expensive pressure sensors 21 can be reduced in half, (for example, while a conventional gas turbine including 16 combustors 10 has required 16 pressure sensors 21, the number of the pressure sensors can be reduced to eight by using the attachment structure 20 of the combustion oscillation detecting device according to the present invention) so that the manufacturing cost and the running cost can drastically be reduced.

Moreover, temperature of the pressure sensor 21 during operation of the gas turbine can be reduced, (conventionally, a pressure sensor 21 attached directly to a wall of a combustor basket 16 has been subjected to significantly high temperature. On the other hand, by use of the attachment structure 20 of the combustion oscillation detecting device according to the present invention, the pressure sensor 21 is provided at a position spaced away from the combustor basket 16. Therefore, temperature of the pressure sensor 21 during operation of the gas turbine can be reduced.) so that the pressure sensor 21 can be prevented from damaging due to heat, and extension of a service life of the pressure sensor 21 can be realized.

Conventionally, the pressure sensor 21 has been attached to a wall of a combustor basket 16. According to this manner, occasionally, an attachment position of the pressure sensor 21 varies depending on arrangement of the combustor baskets 16 in the combustor casing 11. Consequently, various combustor baskets 16 must be designed and manufactured. According to this embodiment, on the other hand, the pressure sensor 21 is attached to the connecting pipe 17, so that commonality of the combustor baskets 16 can be achieved.

Moreover, the connecting pipe 17, which is rotatable about a longitudinal axis, facilitates change in the attachment position of the pressure sensor 21, so that a high design flexibility concerning the attachment position of the pressure sensor 21 can be realized. Thus, reduction in costs and improvement in maintainability can be achieved.

Furthermore, the pressure fluctuations caused by combustion oscillations are transmitted to the pressure sensor 21 through the baffle plate 26. Therefore, stable pressure detection can be carried out and prevents the pressure sensor 21 from being operated erroneously.

In addition, the pressure sensor 21 can be located (disposed) in the vicinity of the connecting pipe 17, which is close to the flame and, therefore, can detect (monitor) the pressure fluctuations by the combustion oscillations with accuracy and reliability.

In the above-described embodiment, more preferably, the pressure sensor 21 has a sequence incorporated therein in order to, upon detection of abnormal pressure fluctuations, give an alarm in accordance with a level (degree) of the pressure fluctuations or to urgently shut down the gas turbine while giving an alarm.

The pressure sensor 21 attached to the connecting pipe 17 can detect abnormal pressure fluctuations occurring at one of the combustors 10 connected to each other through the connecting pipe 17, and can operate the sequence described above.

In the above-described embodiment of the present invention, further, the casing 22 is attached to the connecting pipe 17 with the conduit 23 being interposed therebetween; however, the present invention is not limited thereto. For example, the casing 22 may be attached directly to the connecting pipe 17 without the conduit 23 being interposed therebetween. Alternatively, the pressure sensor 21 may be attached directly to the connecting pipe 17.

The invention claimed is:

1. An attachment structure comprising:

a plurality of combustion oscillation detecting device casings, each housing a combustion oscillation detecting device; and a plurality of combustors arranged annularly in a combustor casing, each connected to each other by cross-flame tubes, wherein the plurality of combustion oscillation detecting device casings are each attached to every other one of the cross-flame tubes.

2. The attachment structure according to claim 1, wherein a baffle plate is interposed between each of the plurality of combustion oscillation detecting device casings and the cross-flame tube.

3. A combustor of a gas turbine, comprising the attachment structure according to claim 1.

4. A gas turbine comprising the combustor according to claim 3.

5. A combustor of a gas turbine, comprising the attachment structure according to claim 2.

6. A gas turbine comprising the combustor according to claim 5.

* * * * *

UNITED STATES PATENT AND TRADEMARK OFFICE

CERTIFICATE OF CORRECTION

PATENT NO. : 8,418,475 B2
APPLICATION NO. : 12/519574
DATED : April 16, 2013
INVENTOR(S) : Tanimura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 698 days.

Signed and Sealed this
First Day of September, 2015

Michelle K. Lee
*Director of the United States Patent and Trademark Office*